(12) United States Patent
Bindana et al.

(10) Patent No.: US 11,546,483 B2
(45) Date of Patent: Jan. 3, 2023

(54) PLATEN GLASS WITH LIGHT STRIPS

(71) Applicant: Xerox Corporation, Norwalk, CT (US)

(72) Inventors: Srinivasarao Bindana, Andhra Pradesh (IN); John Allott Moore, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 68 days.

(21) Appl. No.: 17/127,429

(22) Filed: Dec. 18, 2020

(65) Prior Publication Data

US 2022/0201147 A1 Jun. 23, 2022

(51) Int. Cl.
*H04N 1/028* (2006.01)
*H04N 1/00* (2006.01)
*H04N 1/203* (2006.01)

(52) U.S. Cl.
CPC ....... *H04N 1/0288* (2013.01); *H04N 1/00411* (2013.01); *H04N 1/00413* (2013.01); *H04N 1/00482* (2013.01); *H04N 1/00721* (2013.01); *H04N 1/2038* (2013.01)

(58) Field of Classification Search
None
See application file for complete search history.

(56) References Cited

U.S. PATENT DOCUMENTS

| 2006/0146380 A1* | 7/2006 | Budelsky | H04N 1/1013 358/509 |
| 2017/0180574 A1* | 6/2017 | Phelps | H04N 1/00713 |

\* cited by examiner

*Primary Examiner* — Andrew H Lam

(57) ABSTRACT

A document scanning device is disclosed. For example, the document scanning device includes a platen glass, an optical scanner located below the platen glass, a plurality of light arrays located around a perimeter of the platen glass, and a processor communicatively coupled to the optical scanner and the plurality of light arrays, wherein the processor is to control a portion of the plurality of light arrays to define an origin and an orientation of a document for a scan job and control the optical scanner to scan the document on the platen glass.

19 Claims, 8 Drawing Sheets

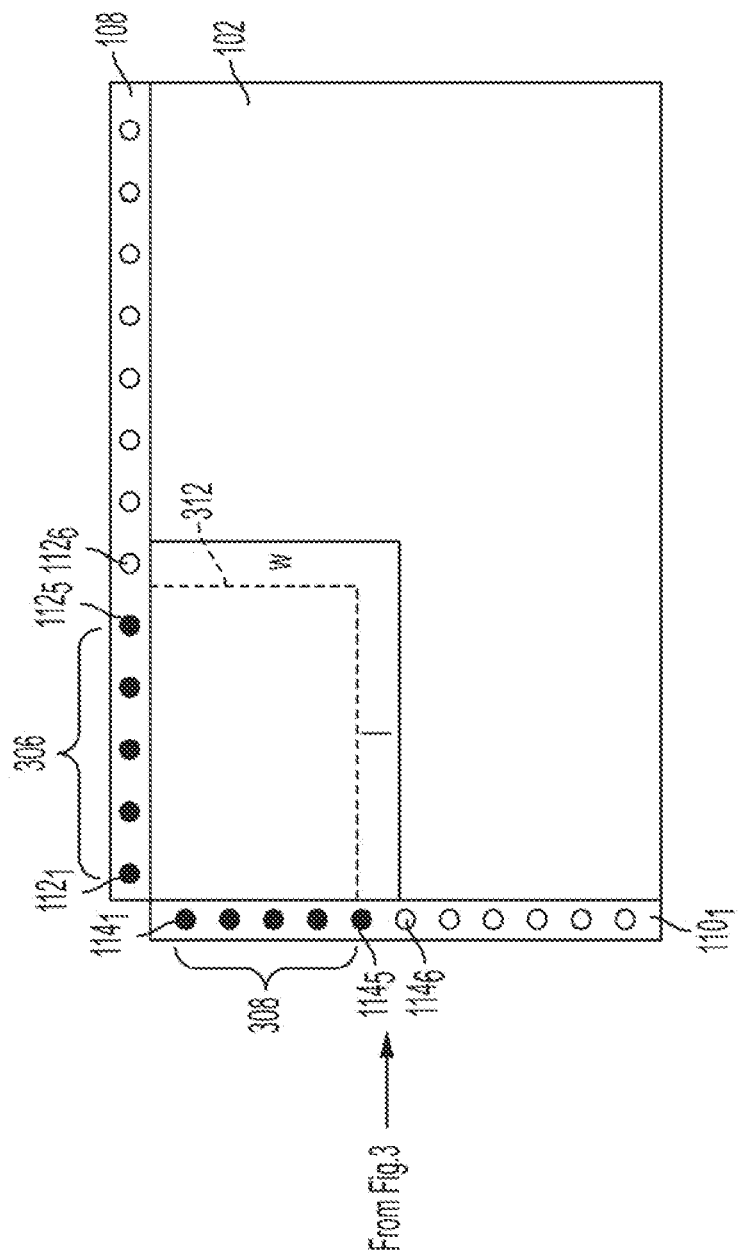

PLATEN GLASS WITH LIGHT STRIPS

The present disclosure relates generally to multi-function devices (MFDs), and relates more particularly to MFDs having a platen glass with light strips to identify scan regions.

BACKGROUND

Multi-function devices (MFDs) are used to process print jobs. An MFD can perform a variety of different functions including printing, scanning, copying, faxing, and the like.

The MFD may include a platen glass upon which a document is placed. A scanner may be located below the platen glass to scan the image for copying, scanning, or faxing. For example, a document may be placed on the platen glass, a scanning function may be initiated, and a scanner may move across the platen glass to capture an image of the document.

SUMMARY

According to aspects illustrated herein, there are provided a document scanning device and a method to define a scan region on a platen glass using light arrays. One disclosed feature of the embodiments is a document scanning device that comprises a platen glass, an optical scanner located below the platen glass, a plurality of light arrays located around a perimeter of the platen glass, and a processor communicatively coupled to the optical scanner and the plurality of light arrays, wherein the processor is to control a portion of the plurality of light arrays to define an origin and an orientation of a document for a scan job and control the optical scanner to scan the document on the platen glass.

Another disclosed feature of the embodiments is a method to define a scan region on a platen glass using light arrays. The method comprises receiving, by a processor, a selection of parameters for a scan job, determining, by the processor, an origin and an orientation on the platen glass based on the selection of parameters for the scan job, and controlling, by the processor, portions of the light arrays to define the scan region, to indicate the origin, and to indicate the orientation.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
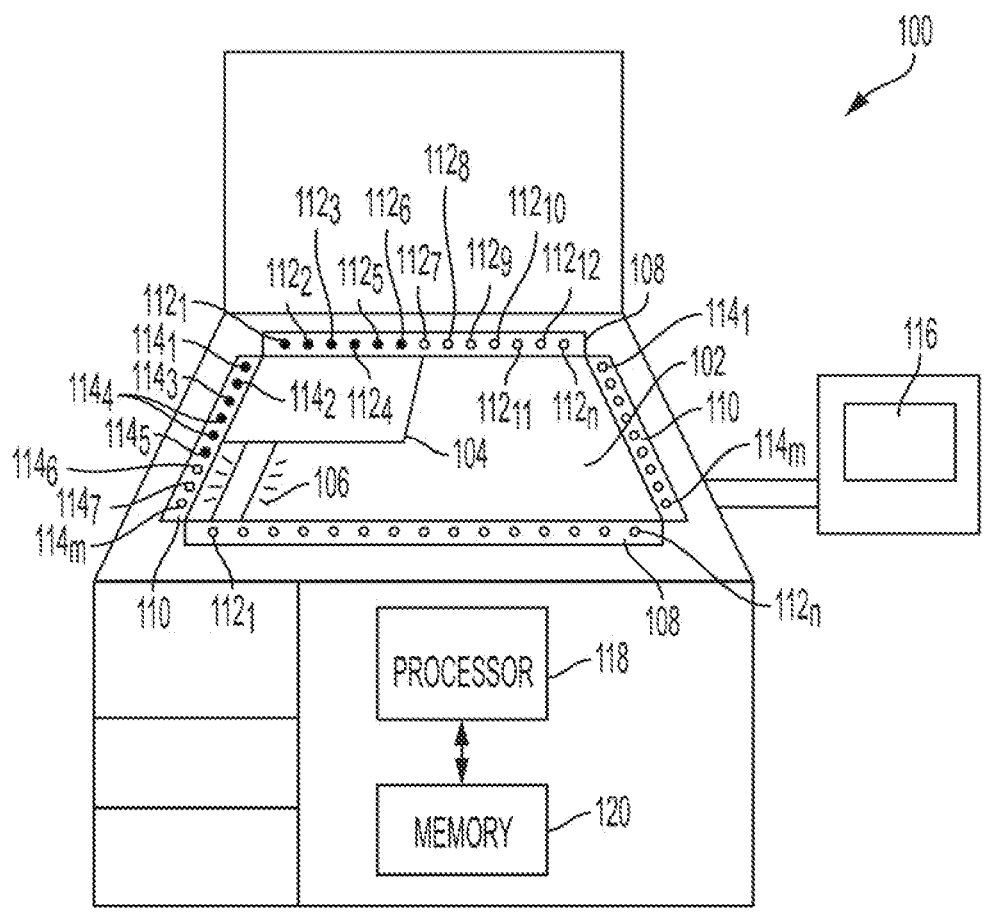
FIG. 1 illustrates a block diagram of an MFD or document scanning device that includes a platen glass with light arrays of the present disclosure.

The present disclosure broadly discloses a document scanning device with light arrays to define a scan region on a platen glass of the document scanning device. As discussed above, one example of a document scanning device is an MFD that may include a platen glass upon which a document is placed. A scanner may be located below the platen glass to scan the image for copying, scanning, or faxing. For example, a document may be placed on the platen glass, a scanning function may be initiated, and a scanner may move across the platen glass to capture an image of the document.

For the scan or copy function, the MFD may expect the document to be placed in a certain location and orientation. Some MFDs may have a static indicator to identify the origin. However, many do not indicate the orientation. For example, different sized documents may be placed with a different orientation. To illustrate, some sized documents may be placed in a portrait orientation, while other sized documents may be expected to be placed in a landscape orientation.

Without any indication to the proper orientation, a user may place the document on the platen glass in the incorrect orientation. After the document is scanned, the user may realize that the document was placed in the incorrect orientation and may have a portion of the document missing from the scan job.

In addition, when scanning several different sized documents, a user may have to go through a series of menus on the user interface to change the paper size and scan region. Going back and forth between scanning and making selections in the user interface can be time consuming and inefficient.

The present disclosure provides light arrays that are located around the platen glass of the MFD. The light arrays may be dynamically controllable to provide an indication to the correct origin and orientation of the document on the platen glass for a scan or copy function. For example, the user may select a scan function and an appropriate paper size. Based on the selection, the MFD may light up portions of the light array around the platen glass that indicate the origin and orientation of the document.

In one embodiment, the light array may include a touch sensor that can be used to activate and/or deactivate selected portions of the light array. The user may swipe in a first direction to activate portions of the light array and swipe in a second, opposite direction, to deactivate portions of the light array. The touch sensor light array may allow a user to select an origin and orientation for a scan job via selection of a desired region with the touch sensor light array. The selection may then be processed by the MFD to change the appropriate menu selections in the user interface accordingly.

In addition, the touch sensor light array may allow the user to easily crop portions of a document using the touch sensor light array, define different active scan regions on the platen glass for different documents that are scanned simultaneously, and the like. As a result, the platen glass with light arrays of the present disclosure may allow scanning and/or copying of documents on the MFD to be performed more accurately and efficiently.

FIG. 1 illustrates an example MFD 100 of the present disclosure. It should be noted that FIG. 1 illustrates a simplified block diagram of the MFD 100 and may include additional components that are not shown. For example, the MFD 100 may include paper trays, a digital front end, various paper transport paths, finishing options, output trays, and the like. The MFD 100 may also be more generally any type of document scanning device.

In one embodiment, the MFD 100 may include a platen glass 102 that can receive a document 104. An optical scanner 106 may be used to scan the document 104 on the platen glass 102. The optical scanner 106 may be a charge coupled device (CCD).

In one embodiment, the MFD 100 may include a user interface 116. The user interface 116 may be a graphical user interface (GUI) that includes a touch screen or a user interface with physical buttons. The user interface 116 may allow a user to select parameters for a scan job or copy job. For example, the parameters may include a paper size, a resolution, an image size, a number of copies, finishing options, and the like.

In one embodiment, the memory 120 may include instructions that are executed by the processor 118 to automatically detect an original size of the document 104 placed on the platen glass 102. The processor 118 may then automatically select some parameters for the scan job based on the detected size of the document 104. For example, the MFD may have an "auto detect" feature to detect certain parameters for the scan job. The examples described herein may refer to a scan job, but it should be noted that the embodiments of the present disclosure may also apply to a copy job.

In one embodiment, the MFD 100 may include a light array 108 and a light array 110. The light arrays 108 and 110 may be located around a perimeter of the platen glass 102. At least one light array 108 may be located adjacent to the platen glass 102 along a length of the perimeter and at least one light array 110 may be located adjacent to the platen glass 102 along a width of the perimeter. In other words, although FIG. 1 illustrates an example with four light arrays around the platen glass 102, it should be noted that two light arrays may also be deployed (e.g., one light array 108 and one light array 110).

In one embodiment, the light array 108 may include a plurality of light sources $112_1$ to $112_n$ (hereinafter also referred to individually as a light source 112 or collectively as light sources 112). In one embodiment, the light array 110 may include a plurality of light sources $114_1$ to $114_m$ (hereinafter also referred to individually as a light source 114 or collectively as light sources 114). In one embodiment, the light sources 112 and the light sources 114 may be light emitting diodes (LEDs).

In one embodiment, the light sources 112 may be arranged in single line along a length of the light array 108. The light sources 114 may be arranged in a single line along a length of the light array 110. In another embodiment, the light array 108 may include two different colored light sources 112 arranged in the single line in an alternating fashion (e.g., green, red, green, red, etc.) or in two parallel lines. The light array 110 may similarly include two different colored light sources.

The light sources 112 and 114 may be dynamically controlled based on parameters selected for the scan job to provide visual cues with respect to an origin and an orientation. The origin may be a location where a corner of the document 104 should be located. The orientation may indicate whether the document 104 should be placed in a portrait or landscape orientation. The light sources 112 and 114 may also be dynamically controlled to define a scan region. For example, the scan region may include a boundary where the optical scanner 106 may be active to capture image data from the document 104. Defining different scan regions may allow the user to crop the document 104, scan different portions of the document 104, or simultaneously scan a plurality of different documents and different sized documents, as discussed in further details below and illustrated in FIGS. 3-5.

In one embodiment, the MFD 100 may include a processor 118 and a memory 120. The processor 118 may be communicatively coupled to the optical scanner 106, the light arrays 108 and 110, the user interface 116, and the memory 120. The processor 118 may receive parameters selected from the user interface 116 and dynamically control the light sources 112 and 114 in the light arrays 108 and 110, respectively.

For example, a scan job with 8.5×11 inch paper may have an origin in the top left corner of the platen glass 110. The default orientation may be a landscape orientation. As a result, when the user selects a scan job with 8.5×11 inch paper, the processor 118 may change a status of the light sources 112 and 114 to define a scan region that has a size of 8.5×11 inches in a landscape orientation with an origin in the top left corner of the platen glass 102.

For example, the light sources 112 and 114 may be controlled to turn on and off, change color (e.g., red and green), and so forth. FIG. 1 illustrates that light sources $112_1$ to $112_6$ in the light array 108 are activated (e.g., turned on or changed to a green color) and light sources $112_7$ to $112_n$ are deactivated (e.g., turned off or changed to a red color). The light sources $114_1$ to $114_5$ in the light array 110 are activated and light sources $114_6$ to $114_m$ are deactivated.

As a result, when a user selects a scan job with 8.5×11 inch paper and opens the cover over the platen glass 102, the user may see the activated light sources $112_1$ to $112_6$ and $114_1$ to $114_5$. If the user attempts to place the document 104 in a portrait orientation, the user can quickly see that a portion of the document 104 may extend beyond the activated light source $114_5$ in the light array 110. Thus, the activated light sources $112_1$ to $112_6$ and $114_1$ to $114_5$ quickly provide visual cues with respect to the correct scan region, origin, and/or orientation for the selected parameters of the scan job.

If the user were to select a different scan job with 11×14 inch paper, the processor 118 may change the light sources 112 and 114 that are activated. For example, for 11×14 inch paper light sources $112_1$ to $112_9$ may be activated and light sources $114_1$ to $114_7$ may be activated.

In one embodiment, the memory 120 may store a table with the light sources 112 and 114 that should be activated for each parameter of a scan job or copy job that is selected. Thus, the processor 118 may determine which light sources 112 and 114 should be activated for selected parameters from a table stored in the memory 120.

Figure 2:
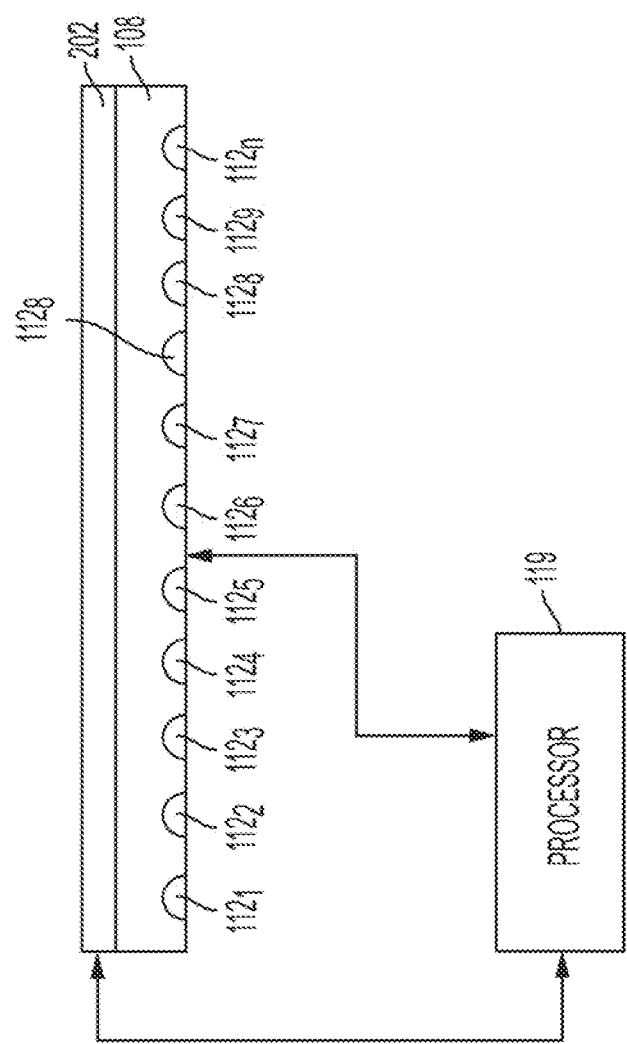
FIG. 2 illustrates a cross-sectional view of an example of the light arrays with a touch sensor of the present disclosure.

In one embodiment, the light arrays 108 and 110 may include a touch sensor that may allow a user to dynamically change the scan region using the touch sensor rather than selecting various menus via the user interface 116. FIG. 2 illustrates a cross-sectional view of an example touch sensor 202.

FIG. 2 illustrates an example touch sensor 202 coupled to the light array 108. However, it should be noted the touch sensor 202 may also be coupled to the light array 110 and operate similarly as described below.

In one embodiment, the touch sensor 202 may be communicatively coupled to the processor 118. The touch sensor 202 may be any type of touch sensor. For example, the touch sensor 202 may be a capacitive touch sensor, a resistive touch sensor, and the like. The touch sensor 202 may be optically clear such that the light emitted from the light sources 112 may be visible through the touch sensor 202.

In one embodiment, touching the touch sensor 202 may change a state of a light source 112 located below the area of the touch sensor 202 that is touched. The memory 120 may store x-y coordinates of the touch sensor 202 and which light source 112 is associated with a particular x-y coordinate range on the touch sensor 202. When a particular location on the touch sensor 202 is touched, a signal that includes the x-y coordinates on the touch sensor 202 that were touched may be transmitted to the processor 118. The processor 118 may determine which light source 112 is associated with the x-y coordinates and change the state of the light source 112.

For example, if the light source $112_1$ was active and the touch sensor 202 over the light source $112_1$ was touched, then the light source $112_1$ may be deactivated. If the light source $112_1$ was deactivated and the touch sensor 202 over the light source $112_1$ was touched, then the light source may be activated.

In one embodiment, a subset of light sources 112 may be controlled with a swiping gesture. In one embodiment, a first direction of the swiping gesture may activate the light sources 112 (e.g., from left to right) and a second direction of the swiping gesture may deactivate the light sources 112 (e.g., from right to left).

For example, a user may define different scan regions by selecting different subsets of the light sources 112 with a swipe gesture. For example, a user may touch the touch sensor 202 at a location over the light source $112_1$ and swipe across the touch sensor 202 to a location over the light source $112_4$. Then, the user may lift his or her finger and touch the touch sensor 202 at a location over the light source $112_7$ and swipe across the touch sensor 202 to a location over the light source $112_9$. As a result, the light sources $112_1$ to $112_4$ may be activated to define a first scan region and the light sources $112_7$ to $112_9$ may be activated to define a second scan region. As a result, when the processor 118 controls the optical scanner 106, the optical scanner 106 may be controlled to capture images of the document 104 between an area that corresponds to the light sources $112_1$ to $112_4$, deactivate between an area that corresponds to the light sources $112_5$ to $112_6$, and reactivate to capture images of the document 104 between an area that corresponds to the light sources $112_7$ to $112_9$.

In addition, the processor 118 may automatically change the parameters within the appropriate menu selections within the scan job software. In other words, the user would not have to go through the menu selections within the user interface 116. Rather, selection of different scan orientations or scan regions via the touch sensor 220 would cause the processor 118 to change the parameters within the menus automatically. For example, if a user changes the scan region to accommodate 11×14 inch paper in a landscape orientation using the touch sensor 202, the processor 118 may change the parameters of the scan job that would be displayed in the user interface to be 11×14 inch paper in a landscape orientation.

Figure 3:
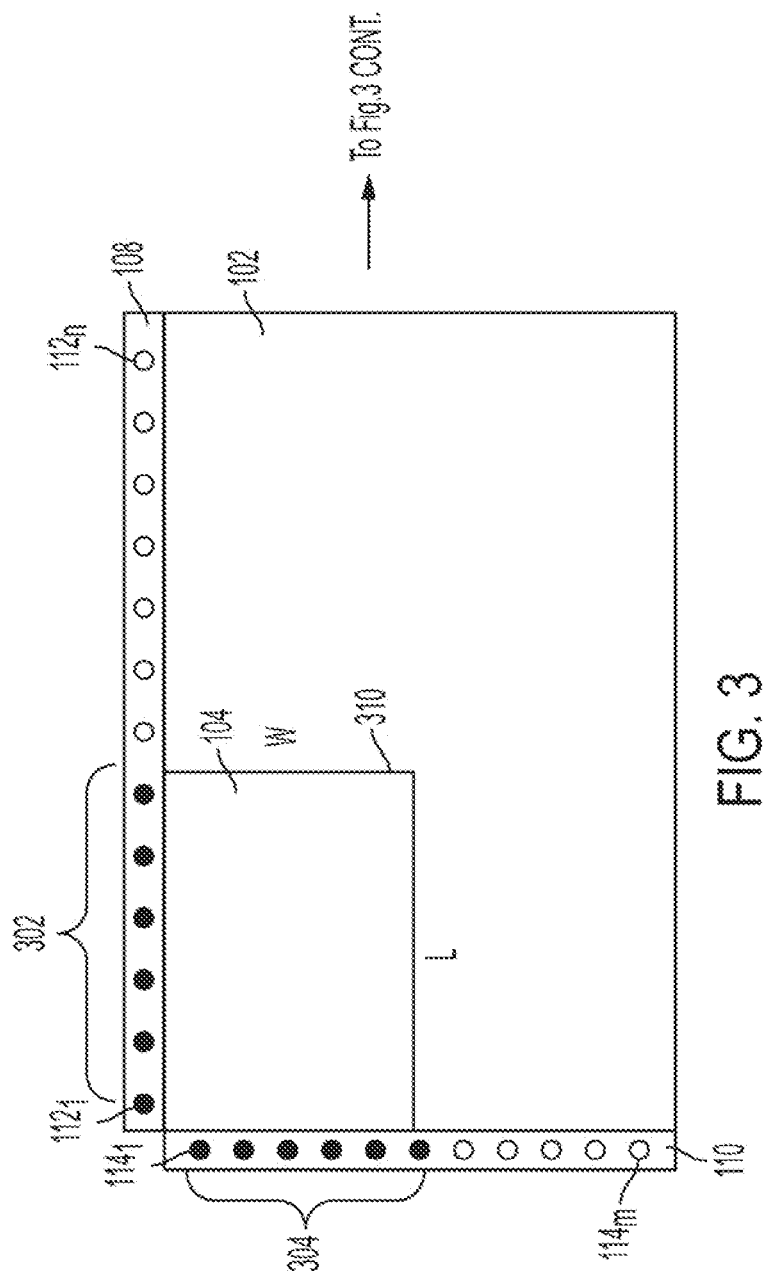
FIG. 3 illustrates an example cropping a document by selecting a particular scan region of the present disclosure.
Figure 4:
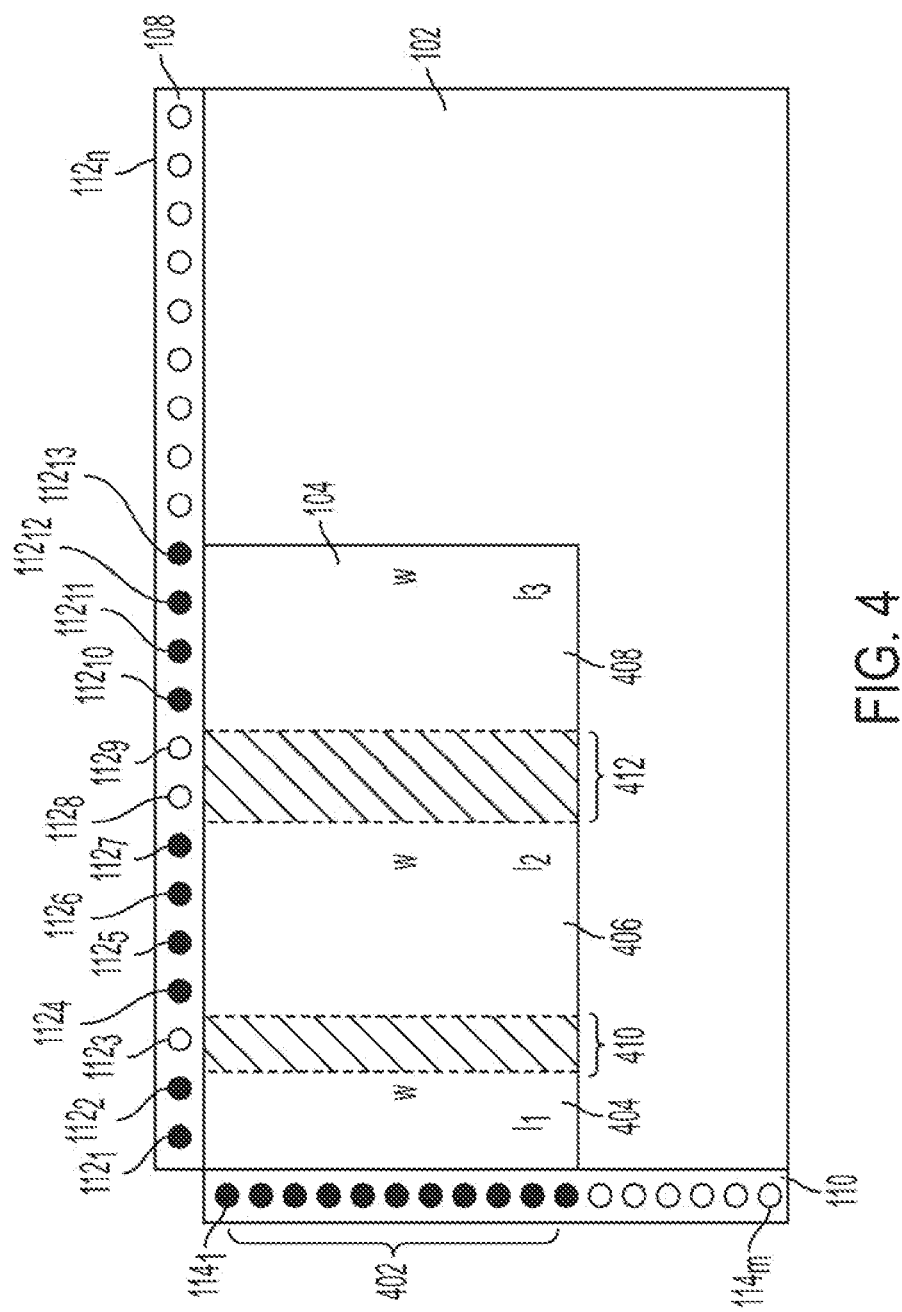
FIG. 4 illustrates an example of selecting different scan regions of a document with the light arrays of the present disclosure.
Figure 5:
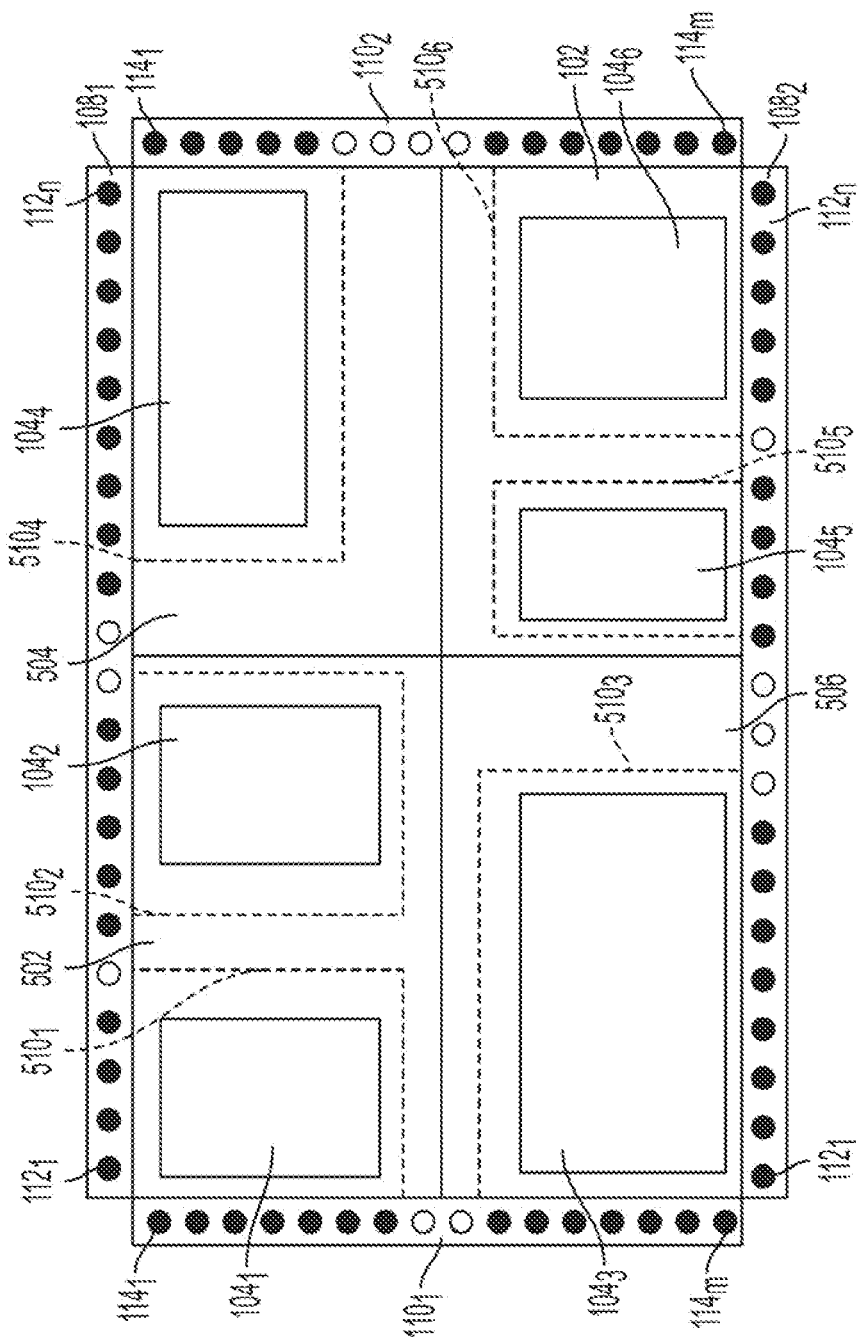
FIG. 5 illustrates an example of defining different scan regions for different documents on the platen glass with the light arrays of the present disclosure.

In one embodiment, the touch sensor 202 may provide additional scan job or copy job features. For example, the user may crop the document 104, select different scan regions for the document 104 (e.g., redact certain portions of the document 104), define several scan regions for multiple documents, and the like. FIGS. 3-5 illustrate different examples of the applications of the touch sensor 202.

FIG. 3 illustrates an example of cropping the document 104 by selecting a particular scan region using the touch sensor 202 of the present disclosure. FIG. 3 illustrates an example where two light arrays 108 and 110 are deployed around the perimeter of the platen glass 102.

Initially, the user may select a scan job of the document 104. The user may select a paper size of W×L. Thus, the processor 118 may activate a subset 302 of the light sources 112 that correspond to a length L and a subset 304 of light sources 114 that correspond to a width W. An initial scan region 310 may be the entire area of W×L.

However, the user may want to crop the document 104 to include a smaller area of the document 104. As a result, the user may touch an area of the touch sensor 202 over the light source $112_6$ and an area of the touch sensor 202 over the light source $114_6$. In another example, the user may swipe across an area of the touch sensor 202 from light source $112_1$ to $112_5$ and swipe across an area of the touch sensor 202 from the light source $114_1$ to $114_5$. As a result, using the touch sensor 202, the user may activate a subset 306 of light sources 112 that include fewer light sources 112 than the subset 302. In addition, the user may activate a subset 308 of light sources 114 that include fewer light sources 114 than the subset 304.

The subsets 306 and 308 may define a new scan region 312 that is smaller than the initial scan region 310. As a result, when the scan job is started, the optical scanner 106 may scan images from the document 104 within the scan region 312. In other words, the document 104 may be cropped to scan the portion of the document 104 that falls within the new scan region 312.

FIG. 4 illustrates an example of selecting different scan regions of a document using the touch sensor 202 on the light arrays 108 and 110 of the present disclosure. FIG. 4 illustrates an example where two light arrays 108 and 110 are deployed around the perimeter of the platen glass 102.

In one embodiment, the user may select different scan regions 404, 406, and 408 by touching different areas of the touch sensor 202 on the light arrays 108 and 110. For example, the user may want to scan different portions within the document 104 and remove (or prevent scanning of non-scanned regions 410 and 412) other portions of the document 104. For example, the scan region 404 may have width w and a length $l_1$, the scan region 406 may have a width w and a length $l_2$, and the scan region 408 may have a width w and a length $l_3$.

In one embodiment, the user may define the scan regions 404, 406, and 408 by touching different portions of the touch sensor 202 over the light arrays 108 and 110. For example, the user may touch the touch sensor 202 over light sources 114 within a subset 402. The user may also touch the touch sensor 202 over the light sources $112_1$ to $112_2$, the light sources $112_4$ to $112_7$, and the light sources $112_{11}$ to $112_{13}$. In another embodiment, the user may define the non-scanned regions 410 and 412 by touching the touch sensor 202 to deactivate the corresponding light sources $112_3$ and light sources $112_8$ to $112_9$.

As a result, when the optical scanner 106 is activated, the optical scanner 106 may scan portions of the document 104 within the scan region 404. When the optical scanner 106 moves within the non-scan region 410, the optical scanner may deactivate. When the optical scanner 106 moves within the scan region 406 the optical scanner 106 may re-activate to scan the portions of the document 104 within the scan region 406. The optical scanner 106 may deactivate within the non-scan region 412, and reactivate within the scan region 408, and so forth.

FIG. 5 illustrates an example of defining different scan regions for different documents 104 using the touch sensor 202 on the light arrays 108 and 110 of the present disclosure. FIG. 5 illustrates an example where four light arrays $108_1$, $108_2$, $110_1$, and $110_2$ may be located around the perimeter of the platen glass 102. In one embodiment, the light arrays $108_1$ and $108_2$ may be on opposite sides along a length of the platen glass 102. The light arrays $110_1$ and $110_2$ may be located on opposite sides along a width of the platen glass 102.

In one embodiment, the four light arrays $108_1$, $108_2$, $110_1$, and $110_2$ may divide the platen glass into 4 different regions 502, 504, 506, and 508. Different dimensions of scan regions may be defined within the regions 502, 504, 506, and 508. For example, the light array $108_1$ and the light array $110_1$ may be used to define scan regions $510_1$ and $510_2$ within the region 502. The light array $108_1$ and the light array $110_2$ may be used to define a scan region $510_4$ within the region 504. The light array $108_2$ and the light array $110_1$ may be used to define a scan region $510_3$ within the region 506, and the light array $108_2$ and the light array $110_2$ may be used to define scan regions $510_5$ and $510_6$ within the region 508.

Although six scan regions $510_1$ to $510_6$ are illustrated in FIG. 5, it should be noted that any number of scan regions may be defined. In addition, although four different light arrays are illustrated, two light arrays may be used to define different scan regions.

In one embodiment, a different sized document $104_1$ to $104_6$ may be placed within each region $510_1$ to $510_6$. As a result, when the optical scanner 106 is activated, the optical scanner 106 may scan each one of the different documents $104_1$ to $104_6$. However, through image processing, the processor 118 may know each defined scan region $510_1$ to $510_6$ contains a different document. The processor 118 may then generate six different scanned images. In other words, rather than a single image that contains the scan of all six documents $104_1$ to $104_6$, the processor 118 may generate six different files or scanned images for each document $104_1$ to $104_6$. Thus, a single scan may simultaneously scan multiple documents $104_1$ to $104_6$ to generate a separate scanned image for each document $104_1$ to $104_6$ via the user defined scan regions $510_1$ to $510_6$.

Figure 6:
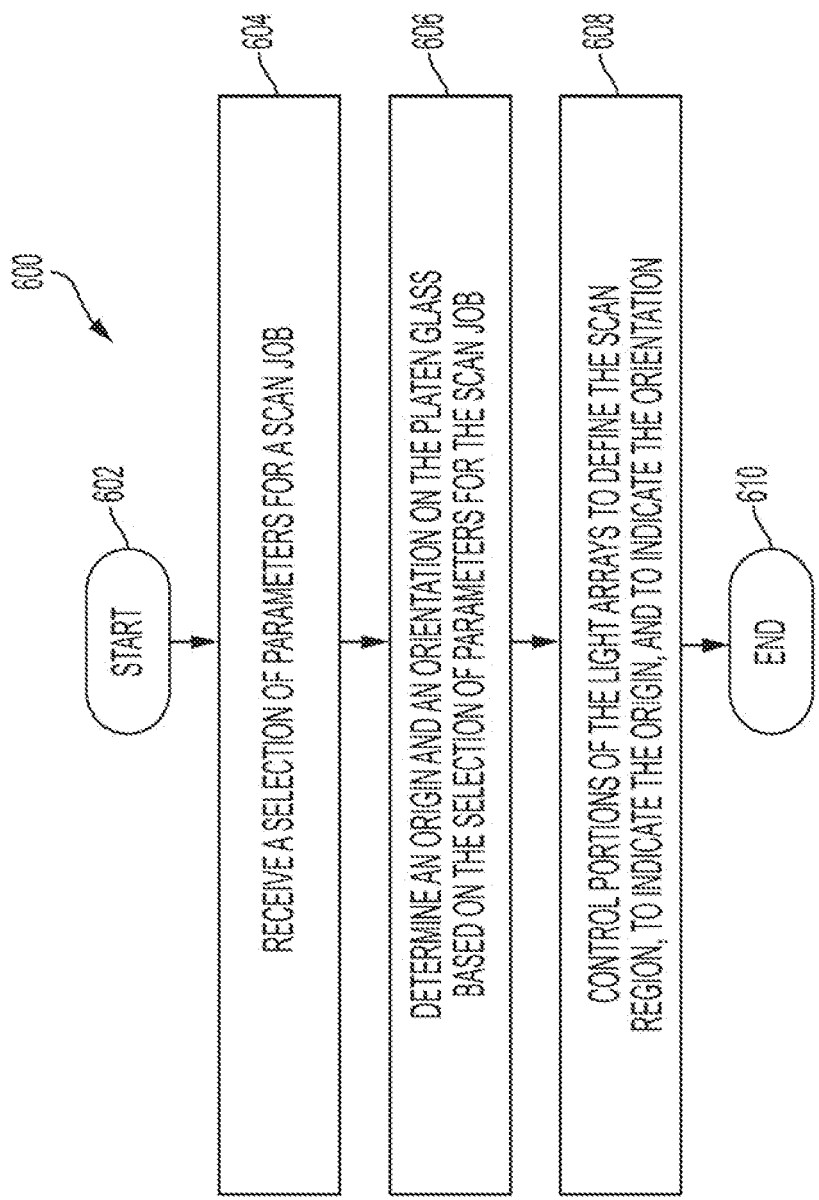
FIG. 6 illustrates an example flow chart of a method for defining a scan region on a platen glass using light arrays of the present disclosure.

FIG. 6 illustrates a flow chart of an example method 600 for defining a scan region on a platen glass using light arrays of the present disclosure. In one embodiment, the method 600 may be performed by the MFD 100 or by an apparatus, such as the apparatus 700 illustrated in FIG. 7 and discussed below.

In one embodiment, the method 600 begins at block 602. At block 604, the method 600 receives a selection of parameters for a scan job. For example, the user may want to scan a document. The user may select a paper size, a resolution, and the like.

In one embodiment, the parameters may be selected automatically by the MFD or document scanning device. For example, the original size of the document may be detected and some parameters such as paper size, image size, resolution, and the like may be automatically selected. For example, the MFD may have an "auto detect" feature to detect certain parameters for the scan job.

At block 606, the method 600 determines an origin and an orientation on the platen glass based on the selection of parameters for the scan job. In one embodiment, each paper size may have a particular default origin and orientation. The scan region may be approximately the same size as the paper size (e.g., a length and width).

At block 608, the method 600 controls portions of the light arrays to define the scan region, to indicate the origin, and to indicate the orientation. In one embodiment, a table may be stored in memory that identifies which light sources are associated with which scan regions and orientations. The processor of the MFD may then control the appropriate light sources within light arrays located around a perimeter of a platen glass of the MFD.

In one embodiment, the light sources may be controlled to turn on and off. For example, the light sources that are on may show the origin where the document should be placed on the platen glass, the orientation of how the document should be placed on the platen glass, and outline the scan region (e.g., the same as the paper size by default).

In one embodiment, the light sources may be controlled to change colors. For example, the light sources may change from red to green. The light sources that emit a green light may show the origin where the document should be placed on the platen glass, the orientation of how the document should be placed on the platen glass, and outline the scan region (e.g., the same as the paper size by default).

As noted above, the light sources can be dynamically controlled to define different origins, orientations, and scan regions. For example, the user may want to scan a second document that has a different paper size than the first document. The MFD may receive a selection of different parameters for the second scan job. The origin and the orientation on the platen glass may be determined based on the selection of the different parameters for the second scan job. Then the different portions or light sources of the light arrays may be controlled to define the scan region, to indicate the origin, and the orientation. For example, the second document may be wider and longer than the first document. As a result, additional light sources of the light arrays may be controlled to be activated to indicate the origin, orientation, and scan region for the second document.

In one embodiment, the scan regions may be dynamically changed using a touch sensor. For example, each light array may include a touch sensor. A user may control operation of the light sources using a touch gesture (e.g., touching the touch sensor at a location over each light source, or swiping to control a plurality of light sources with a single gesture).

For example, after the user places a document on the platen glass, the user may want to change the scan region. Rather than going through the menus via the user interface, the user may simply use the touch sensor on the light arrays to define a new scan region.

The method 600 may receive a signal that indicates a different portion of the light arrays is selected from the touch sensor associated with the light arrays. Then the scan region can be changed in accordance with the different portion of the light arrays that is selected. For example, the document can be cropped, different portions of the document can be scanned or redacted, or different documents can be simultaneously scanned, as described above and illustrated in FIGS. 3-5. At block 610, the method 600 ends.

Figure 7:
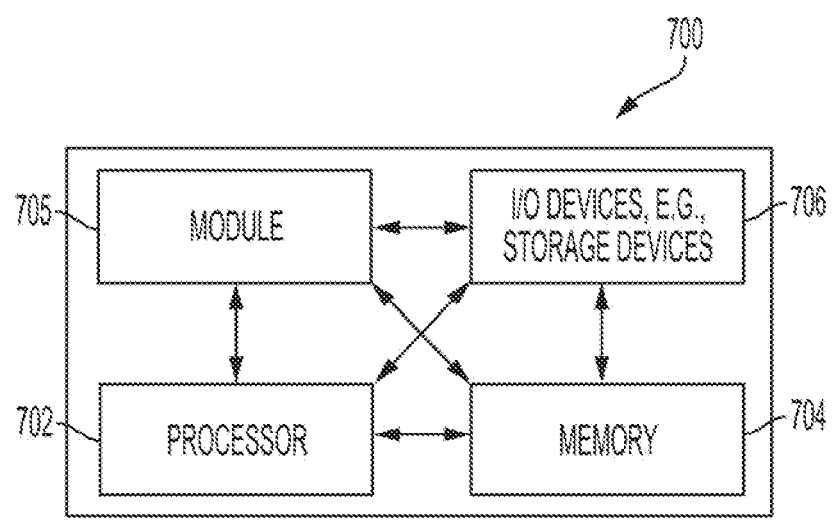
FIG. 7 illustrates a high-level block diagram of an example computer suitable for use in performing the functions described herein.

FIG. 7 depicts a high-level block diagram of a computer that is dedicated to perform the functions described herein. As depicted in FIG. 7, the computer 700 comprises one or more hardware processor elements 702 (e.g., a central processing unit (CPU), a microprocessor, or a multi-core processor), a memory 704, e.g., random access memory (RAM) and/or read only memory (ROM), a module 705 for defining a scan region on a platen glass using light arrays, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 705 for defining a scan region on a platen glass using light arrays (e.g., a software program comprising computer-executable instructions) can be loaded into memory 704 and executed by hardware processor element 702 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for defining a scan region on a platen glass using light arrays (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A document scanning device, comprising:
a platen glass;
an optical scanner located below the platen glass;
a plurality of light arrays located around a perimeter of the platen glass; and
a processor communicatively coupled to the optical scanner and the plurality of light arrays, wherein the processor is to control a portion of the plurality of light arrays to define an origin and an orientation of a document for a scan job and control the optical scanner to scan the document on the platen glass, wherein the portion of the plurality of light arrays emits a first color and remaining portions of the plurality of light arrays emit a second color.

2. The document scanning device of claim 1, further comprising:
a user interface to select parameters for the scan job.

3. The document scanning device of claim 2, wherein the portion of the plurality of light arrays is activated based on the parameters that are selected for the scan job.

4. The document scanning device of claim 2, wherein the parameters include a paper size.

5. The document scanning device of claim 1, wherein the plurality of light arrays comprises at least one light emitting diode (LED) array along a width of the platen glass and at least one LED array along a length of the platen glass.

6. The document scanning device of claim 1, wherein the portion of the plurality of light arrays is activated and remaining portions of the plurality of light arrays are deactivated.

7. The document scanning device of claim 1, wherein each one of the plurality of light arrays comprises a touch sensor.

8. The document scanning device of claim 7, wherein the touch sensor is to add a border of a scan region when the touch sensor detects a swipe in a first direction.

9. The document scanning device of claim 8, wherein the touch sensor is to remove the border of the scan region when the touch sensor detects the swipe in a second direction.

10. The document scanning device of claim 9, wherein the processor is to change scan parameters within menus of a user interface based on the scan region defined by the swipe detected by the touch sensor.

11. A document scanning device, comprising:
a platen glass;
an optical scanner located below the platen glass;
a plurality of light arrays located around a perimeter of the platen glass; and
a processor communicatively coupled to the optical scanner and to the plurality of light arrays, wherein the processor is to control a portion of the plurality of light arrays to define an origin and an orientation of a document for a scan job and to control the optical scanner to scan the document on the platen glass, wherein each one of the plurality of light arrays comprises a touch sensor.

12. The document scanning device of claim 11, wherein the touch sensor is to add a border of a scan region when the touch sensor detects a swipe in a first direction.

13. The document scanning device of claim 12, wherein the touch sensor is to remove the border of the scan region when the touch sensor detects the swipe in a second direction.

14. The document scanning device of claim 13, wherein the processor is to change scan parameters within menus of a user interface based on the scan region defined by the swipe in the first direction or the swipe in the second direction.

15. The document scanning device of claim 11, further comprising:
a user interface to select parameters for the scan job.

16. The document scanning device of claim 15, wherein the portion of the plurality of light arrays is activated based on the parameters that are selected for the scan job.

17. The document scanning device of claim 15, wherein the parameters include a paper size.

18. The document scanning device of claim 11, wherein the plurality of light arrays comprises at least one light emitting diode (LED) array along a width of the platen glass and at least one LED array along a length of the platen glass.

19. The document scanning device of claim 11, wherein the portion of the plurality of light arrays is activated and remaining portions of the plurality of light arrays are deactivated.

* * * * *